United States Patent Office 3,174,949
Patented Mar. 23, 1965

3,174,949
MELT EXTRUDABLE POLYURETHANES SUITABLE FOR ELASTIC THREADS
Cyril N. Harper, Easthampton, Mass., assignor to United Elastic Corporation, Easthampton, Mass., a corporation of Massachusetts
No Drawing. Filed July 18, 1961, Ser. No. 124,779
8 Claims. (Cl. 260—75)

This invention relates to improved formulations of polyurethane plastic for melt extrusion into elastic threads. The invention includes in addition to the formulation improved procedural steps for the production of the plastic and for its extrusion. The nature of the plastic at certain of the steps is also novel and is included within the scope of the present invention.

The problem of elastic thread, especially for use in garments such as girdles, which are exposed to body oils, has presented a serious problem because of the fact that ordinary rubber thread is gradually weakened by body oils. Attempts have been made to produce elastic threads of polyurethane plastics. Some threads have achieved a certain amount of practical utility but they have been produced in general by solvent spinning methods, which introduce a serious fire and sometimes health hazard by reason of the nature of the solvents used. Attempts to produce threads by the melt spinning of molten polyurethane plastic have not hitherto achieved practical success or at least the products have been of a nature which does not meet various standards. It is with the solution of the problem of producing threads by the melt spinning of polyurethane plastic that the present invention deals.

There are several types of polyurethane resins. Essentially the plastic is composed of building blocks of linear polymers which are joined together with urethane linkages and sometimes linearly extended with other bifunctional elements notably dihydric aliphatic alcohols. In general two types of linear polymers have been used as building blocks. These are polyethers, such as polyether polyglycols; and polyesters, which are ordinarilly produced from dihydric aliphatic alcohols and dibasic acids. It is with the polyester type of polyurethane plastics that the present invention deals.

The formation of the urethane linkages may be effected by two general processes. The first involves the pressure of amino groups on the polyesters which can be reacted with various bischloroformates or the polyesters may be reacted with various organic diisocyanates, either aromatic or aliphatic. The present invention deals only with procedures which follow the latter type of formation.

Essentially in producing the polyurethane elastomers extrudable in accord with the present invention three steps are involved. First, a polyester is reacted with part of the total amount of diisocyanate to be used. Then this product, which is often referred to as a prepolymer, is reacted with an additional amount of diisocyanate and also with an extender such as an dihydric alcohol. Finally, the product is melt extruded. The second step, although involving a reaction in which both the additional isocyanate and the extender take place, may physically be effected in two parts, for example by first adding the additional diisocyanate and then the extender or the two may be introduced at the same time.

The sequence of steps is not broadly new but has been described in Patent 2,625,535. However, the formulations used differ significantly from those employed in the present invention and the nature of the reaction medium which results is quite different. As a result, products of superior properties for elastic thread are obtainable by means of the present invention. The principal field of utility of the present invention is in the production of elastic threads. However, it should be understood that the polymers produced are suitable for extrusion generally and are not necessarily limited to the shape of fine threads. Thus extruded elastic sheets, ribbons or other shapes constitute further fields of utility of the present invention.

The very significant difference from a formulation standpoint from what was known before lies in the first step when a part of the diisocyanate is reacted with a polyester. In the past ratios of from 0.7 to 0.99 mol of diisocyanate per mol of polyester were used, which with the diisocyanate and the polyester employed resulted in a solid product which was quite rubbery and which was processed on suitable equipment, such as rubber mixing rolls. The present invention differs markedly in that the proportions of polyester to diisocyanate are chosen so that as the reaction proceeds the material remains liquid. In general this is brought about by using either less isocyanate or considerably more than in the case described in the prior art. Depending on the materials used, for example, the present invention may employ somewhat less than 0.7 mol of diisocyanate per mol of polyester or more than 1:1 for example 1.2 to 1. Exact figures cannot be given to apply to all circumstances because the ratios which produce liquids vary somewhat with different diisocyanates and with different polyesters. However, the vital requirement of operation in the liquid phase must always be met. Regardless of the amount of diisocyanate used in the first stage addition, the total molar ratio of the diisocyanate compounds and the dihydroxy compounds used is approximately 1.14–1.02 to 1.

As far as the diisocyanates are concerned, the present invention can utilize a wide range. Among the best are aromatic diisocyanates, such as methylene bis (4-phenyl-isocyanate), which is known in the art as MDI, toluene diisocyanate, which is customarily referred to in the art as TDI. For clarity these abbreviated art names will be used in the remainder of the specification. Alicyclic and aliphatic diisocyanates may also be employed, such as tetramethylene diisoocyanate or hexamethylene diisocyanate. In general, in the present invention the types of isocyanates used include known compounds but is not restricted thereto. It is the formulation and the procedural steps in which the novelty of the present invention resides.

The present invention has some definite limits on the polyester used. Polyesters of higher average molecular weight, such as those having average molecular weights of 2,000 and over, do not give threads of optimum properties. The average molecular weight should not exceed 1,400 to any substantial degree, and for optimum results will vary to some extent with the diisocyanate used. For example, the maximum average molecular weight polyester which is tolerable is a little higher with TDI than with MDI. Best results are usually obtained with average molecular weights which do not exceed 1,000, with an optimum, when MDI is used, of an average molecular weight of about 750. There is no exact numerical lower limit, but this is determined by processing characteristics. If the average molecular weight is too low, the reaction medium becomes too stiff for convenient handling. This limit will be reached normally somewhere between 500 and 750 average molecular weight, again, varying a little with the isocyanate used.

The chemical nature of the polyester is not critical. Excellent results are obtained with polyethylene glycol adipate. However, other polyesters are useful in which the dibasic acid, for example, may be sebacic acid and the glycol may be propylene instead of ethylene. Mixed polyester even including aromatic acids such as terephthalic acid may be used so long as a liquid reaction medium, at reaction temperature, can be produced. These polyesters are well known in the art and the above description is merely to be considered as a reference to typical members of a class which is well known in polyurethane plastics. While the polyesters are well known, it is desirable that their physical condition be satisfactory. Any large amounts of moisture content are undesirable, and the polyesters should, therefore, be dried before use though it is not necessary that they be rendered absolutely anhydrous. In general, the polyesters should be terminated by alcoholic hydroxyl groups. At least the vast majority of the terminal groups should be of this nature. Polyesters which are terminated by carboxyl groups are less satisfactory. Some polyesters are known which have branched chains and more than two terminal hydroxyl groups. This type of polyester is not desirable as it does not give threads of optimum properties. It should be realized that polyesters are not single pure chemical compounds but are mixtures, and even when it is attempted to produce polyesters with two terminal hydroxyls per molecule there may be an occasional terminal group which will vary. If these departures from normal are small in number, the products will still remain acceptable. However, essentially the termination should be by two hydroxyl groups.

While the formulation, that is to say the proportions of polyester to diisocyanate, is a very important factor in the first step, in the second and third steps an even more important factor is the degree to which polymerization is carried. When the polymerization proceeds too far, even though still within the range in which melt spinning is possible, threads may be obtained which have desirable properties when first extruded, of course after the conventional stretching which is always a part of fiber formation. However, these threads lose tension when incorporated in fabrics which have to be finished at high temperatures, for example fabrics which have to be steamed. A lower degree of polymerization permits threads which can be used in any kind of fabric regardless of the nature of finishing treatment to which it is to be subjected.

A very practical measurement of degree of polymerization is the so-called "melt stick" method in which a small piece of the solid polymer is drawn across a hot surface and the temperature noted at which it begins to melt or drag. This measure is not one of rigorous scientific accuracy as far as the exact temperature or viscosity which is present in the extruding head is concerned, but it is among the best and most convenient practical methods of determining degree of polymerization. In the present invention a melt stick temperature of about 480° F. is the upper useful limit. Higher melt stick temperatures will not give materials that are useful and even when the upper limit is approached the threads produced may only be useful for fabrics which are not finished at high temperatures. In general, the upper melt stick temperature for threads which are generally useful is about 425° F. optimum results are obtained at considerably lower degrees of polymerization.

The lower limit in polymerization is a practical one and because it will vary somewhat with the nature of the chemicals used is not suitable for definition by melt stick temperatures. However, it can be defined in terms of the well known characteristic of melt spinning fibers. The plastic for making any melt spun fiber must be polymerized sufficiently so that it will not stick to extrusion needles or produce uneven threads or weak threads which break. This degree of polymerization is referred to in the art as "fiber forming range." This accepted terminology will be utilized in the present specification and claims in the precise meaning in which it is always used in the art. As pointed out above, depending on the particular molecular weight of polyester and the diisocyanate used, this fiber-forming range will begin at somewhat different melt stick temperatures.

The extenders used are not new in the art, and it is an advantage of the present invention that well known extender chemicals may be employed. The preferred extenders are dihydric alcohols, typical examples of which are 1,4 butane diol and 1,5 pentane diol.

The products of the present invention are characterized by superior physical properties such as elongation at break of at least 400% and exceeds 500% for the preferred products.

The invention will be described in greater detail in conjunction with specific examples in which the proportions are expressed in mols.

*Example 1*

One mol of polyethylene glycol adipate of an average molecular weight of 750 is mixed with 0.67 mol of MDI. The polyester should be dried, for example, by heating to a temperature of 130° C. under a vacuum for one to two hours. Before the MDI is added the polyester should be cooled down to about 100° C. and after the addition the reaction medium maintained at about this temperature for about an hour.

The reaction mixture is then cooled to about 90° C. and the second step begins by adding .94 mol of MDI and reacting for approximately fifteen minutes. Then .485 mol of 1,4 butane diol is added and the mixture aged in a hot room until a melt stick temperature of 355° F. is reached. The material is then melt spun and given a 50% stretch on the extruding machine before winding on a spool. The thread is then cured for four hours at 230° F. and showed the following physical properties:

Elongation at break _____percent__ 505
300% modulus outgoing curve, IP-2 machine ___ 3500
300% modulus return curve, IP-2 machine _____ 508
Tensile strength (Chatillon), p.s.i. _____ 9250

*Example 2*

The procedure of Example 1 was repeated except that in the first step 1.2 mols of MDI was reacted with the polyester and a smaller amount of MDI, 0.4 mol, was added during the second step. The amount of the 1.4 butane diol was the same.

The final polymer was aged to a melt stick temperature of 480° F. and when melt spun as described in Example 1 the thread had the following physical properties:

Elongation at break _____percent__ 555
250% modulus outgoing curve, IP-2 machine ____ 3225
250% modulus return curve, IP-2 machine _____ 444
Tensile strength (Chatillon), p.s.i. _____ 8575

*Example 3*

The procedure of Example 1 was repeated but the polyester used had an average molecular weight of 1,000. The final polymer was aged to a melt stick temperature of 290° F. and after melt extrusion the threads had the following physical properties:

Elongation at break _____percent__ 690
300% modulus outgoing curve _____ 902
300% modulus return curve _____ 235
Tensile strength (Chatillon), p.s.i. _____ 11,800

*Example 4*

This example deals with a different type of dissocyanate, namely meta-xylylene dissocyanate having the formula

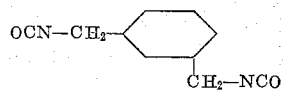

In the first step one mol of ethylene glycol adipate polyester average mol weight 1,000 and 1.2 mols of meta-xylylene diisocyanate are reacted for 2½ hours at 100° C. The polyester is dried as described in the preceding examples. The mixture is then cooled to 90° C. and an additional 0.4 mol of meta-xylylene diisocyanate added and reacted for about one hour. Then 0.485 mol of 1,4 butane diol is added and reaction continued until a melt stick temperature of 350° F. is reached. After extrusion and curing the finished thread showed good tensile strength and high elongation.

It will be noted that the reaction times are considerably longer than with MDI because the meta-xylene diisocyanate is less reactive, and as the isocyanate groups are attached to the side chains the compound has less purely aromatic characteristics and in this respect resembles somewhat aliphatic diisocyanates.

I claim:

1. A method of producing a polyurethane for melt extrusion which comprises reacting a polyester of not over 1400 and not less than 750 average molecular weight with an organic diisocyanate outside the range of 0.7 mol of diisocyanate to 0.99 mol of diisocyanate per mol of polyester in proportions to maintain a liquid reaction medium at reaction temperature, adding in a separate step to the reaction mixture an additional amount of diisocyanate and a diol extender in amounts to produce a melt extrudable polymer, the degree of polymerization being sufficient so that the polymer does not stick to an extrusion head when melt extruded and not greater than that corresponding to a melt stick temperature of 480° F.

2. A method according to claim 1 in which the diisocyanate is an aromatic dissocyanate.

3. A method according to claim 2 in which the diisocyanate is methylene bis (4-phenylisocyanate).

4. A method according to claim 1 in which the glycol is 1,4 butane diol.

5. A method according to claim 1 in which the degree of polymerization of the final polymer does not exceed that corresponding to a melt stick temperature of 425° F.

6. A polyurethane plastic suitable for melt extrusion comprising the reaction product of hydroxyl terminated polyester, at least one organic diisocyanate and an extender, said polymer having a degree of polymerization not less than that which prevents sticking to an extrusion head when melt extruded and not exceeding that corresponding to a melt stick temperature of 480° F. when prepared by a process according to claim 1.

7. A polyurethane plastic suitable for melt extrusion comprising the reaction product of a hydroxyl terminated polyester, at least one organic diisocyanate and an extender, said polymer having a degree of polymerization not less than that which prevents sticking to an extrusion head when melt extruded and not exceeding that corresponding to a melt stick temperature of 425° F. when prepared by a process according to claim 5.

8. A plastic according to claim 7 in which the polyester is a polyethylene adipate of an average molecular weight not exceeding about 1,000 and not over about 750 and the diisocyanate is methylene bis (4-phenylisocyanate) when prepared by a process according to claim 5.

References Cited by the Examiner

UNITED STATES PATENTS

| | | | |
|---|---|---|---|
| 2,621,166 | 12/52 | Schmidt | 260—77.5 |
| 2,861,972 | 11/58 | Müller et al. | 260—75 |
| 2,907,752 | 10/59 | Smith | 260—75 |
| 2,912,408 | 11/59 | Nischk | 260—75 |
| 2,929,804 | 3/60 | Steuber | 260—77.5 |
| 2,981,719 | 4/61 | Mühlhausen | 260—75 |
| 2,999,839 | 9/61 | Arvidson | 260—77.5 |

FOREIGN PATENTS 857,131  12/60  Great Britain.

LEON J. BERCOVITZ, *Primary Examiner.*

H. N. BURSTEIN, DONALD E. CZAJA, *Examiners.*